(12) United States Patent
Kamino et al.

(10) Patent No.: US 6,444,369 B1
(45) Date of Patent: Sep. 3, 2002

(54) GELLED POLYMER ELECTROLYTE LITHIUM SECONDARY CELL

(75) Inventors: Maruo Kamino, Katano; Ryuji Ohshita, Neyagawa; Hiroshi Nakajima, Hirakata; Makoto Uesugi, Sagamihara; Toshiyuki Nohma, Hirakata; Koji Nishio, Kyoto, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/720,094

(22) PCT Filed: Jun. 18, 1999

(86) PCT No.: PCT/JP99/03283

§ 371 (c)(1),
(2), (4) Date: Dec. 21, 2000

(87) PCT Pub. No.: WO00/01026

PCT Pub. Date: Jan. 6, 2000

(30) Foreign Application Priority Data

Jan. 8, 1998 (JP) ............................... 11-002640
Jun. 26, 1998 (JP) ............................... 10-196801

(51) Int. Cl.⁷ ................................................. H01M 6/14
(52) U.S. Cl. ........................ 429/303; 429/312; 429/323; 429/231.1; 429/224; 429/223; 429/221; 429/231.3; 429/231.6
(58) Field of Search ................................. 429/303, 300, 429/312, 323, 231.1, 224, 223, 221, 231.3, 231.6

(56) References Cited

U.S. PATENT DOCUMENTS 6,165,645 A * 12/2000 Nishimura et al. ....... 429/218.1
6,214,061 B1 * 4/2001 Visco et al. ............... 29/623.5

FOREIGN PATENT DOCUMENTS

| JP | 63-152874 A | 6/1988 |
|---|---|---|
| JP | 8-287949 A | 11/1996 |
| JP | 9-102320 A | 4/1997 |
| JP | 9-241024 A | 9/1997 |
| JP | 10-003945 A | 1/1998 |
| JP | 10-188984 A | 7/1998 |
| JP | 10-241732 A | 9/1998 |
| JP | 10-241732 * | 9/1998 |
| JP | 10-255842 A | 9/1998 |

OTHER PUBLICATIONS

J. M. Tarascon et al., "Performance of Bellcore's plastic rechargeable Li–ion batteries", Solid State Ionics, vol. 86–88, pp. 49–54, (1996).

S. Bach et al., "An electrochemical investigation of Li intercalation in the sol–gel $LiMn_2O_4$ spinel oxide", Solid State Ionics, vol. 110, pp. 193–198, (1998).

* cited by examiner

Primary Examiner—Laura Weiner
(74) Attorney, Agent, or Firm—Kubovcik & Kubovcik (57) ABSTRACT

The battery of this invention includes a positive electrode including a gelled polymeric electrolyte (A) and using spinel type lithium manganese oxide as an active material; a negative electrode; a gelled polymeric electrolyte (B) in the shape of a film or sheet also serving as a separator, and both the gelled polymeric electrolyte (A) and the gelled polymeric electrolyte (B) are made from a polymer of poly (alkylene oxide) series impregnated with a liquid electrolyte. Since the battery includes the positive electrode using the specific gelled polymeric electrolyte (A), a contact area between the positive electrode active material and the gelled polymeric electrolyte is large, so as to attain large initial discharge capacity (at high rate discharge in particular). Also, since the battery includes the specific gelled polymeric electrolyte (B) as the electrolyte, manganese included in the spinel type lithium manganese oxide is minimally eluted, and hence, the discharge capacity is minimally degraded during charge-discharge cycles due to elution of manganese, resulting in attaining good charge-discharge cycle performance.

4 Claims, 1 Drawing Sheet

Figure 1

GELLED POLYMER ELECTROLYTE LITHIUM SECONDARY CELL

TECHNICAL FIELD

The present invention relates to a lithium secondary battery including spinel type lithium manganese oxide as a positive electrode active material and gelled polymeric electrolyte as an ion conducting medium, and more particularly, it relates to improvement of a positive electrode for the purpose of providing a lithium secondary battery using a gelled polymeric electrolyte with large initial discharge capacity and good charge-discharge cycle performance.

BACKGROUND ART

As an ion conducting medium (electrolyte) of a lithium secondary battery, a liquid electrolyte (electrolytic solution) has been conventionally used because of its good ionic conductivity although it has problems of leakage and elution of an electrode material.

When a liquid electrolyte is used as an ion conducting medium in a lithium secondary battery using lithium manganese oxide as a positive electrode active material, however, manganese included in the lithium manganese oxide is gradually eluted into the liquid electrolyte, resulting in causing a problem that the discharge capacity is degraded in a small number of charge-discharge cycles.

When a solid electrolyte (such as a film and a foil) is used instead of a liquid electrolyte, the degradation of the discharge capacity due to the elution of manganese into the electrolyte can be avoided. The ionic conductivity of the solid electrolyte is, however, generally lower than that of the liquid electrolyte, and a contact area between the electrolyte and the electrode is so small that the electric resistance (interface resistance) on the interface between the electrolyte and the electrode is large. Therefore, the discharge capacity, at high rate discharge in particular, is degraded.

Accordingly, as an ion conducting medium for improving the disadvantages of and making the best use of the advantages of the liquid electrolyte and the solid electrolyte, a gelled electrolyte, particularly a gelled polymeric electrolyte that can be easily formed into a thin film and is inexpensive, has been recently proposed. A gelled polymeric electrolyte is a gelled substance obtained by impregnating a liquid electrolyte including a solute (electrolytic salt) and a solvent into a matrix of a polymer (resin). Since a gelled polymeric electrolyte includes a liquid electrolyte, it has higher ionic conductivity than a solid electrolyte, and since the liquid electrolyte is fixed through gelation within the matrix of the gelled polymeric electrolyte, manganese is minimally eluted into the liquid electrolyte.

When a gelled polymeric electrolyte is used, however, a contact area between the electrode and the electrolyte is smaller than in using a liquid electrolyte. Therefore, the electric resistance (interface resistance) on the interface between the electrode and the electrolyte is large as in using a solid electrolyte. As a result, the discharge capacity, at high rate discharge in particular, is degraded.

Accordingly, an object of the invention is providing a lithium secondary battery using a gelled polymeric electrolyte with large initial discharge capacity and good charge-discharge cycle performance.

DISCLOSURE OF INVENTION

The lithium secondary battery using a gelled polymeric electrolyte of this invention (present battery) comprises a positive electrode including a gelled polymeric electrolyte (A) and using spinel type lithium manganese oxide as an active material; a negative electrode; and a gelled polymeric electrolyte (B) in the shape of a film or sheet also serving as a separator, and the gelled polymeric electrolyte (A) and the gelled polymeric electrolyte (B) are made from a polymer of poly(alkylene oxide) series impregnated with a liquid electrolyte.

Both the gelled polymeric electrolyte (A) included in the positive electrode and the gelled polymeric electrolyte (B) in the shape of a film or sheet also serving as a separator are the polymers of poly(alkylene oxide) series impregnated with a liquid electrolyte.

Examples of the polymer of poly(alkylene oxide) series are poly(ethylene oxide), poly(propylene oxide), a block copolymer of poly(ethylene oxide) and polystyrene, a block copolymer of poly(ethylene oxide) and polypropylene oxide, polyetherimide, polyethersulfone, polysiloxane and polysulfone. From the viewpoint of the charge-discharge cycle performance, the block copolymer of poly(ethylene oxide) and polystyrene is particularly preferred. In particular, the polymer of poly(alkylene oxide) series used for the gelled polymeric electrolyte (B) preferably has high mechanical strength and a large molecular weight. When, for example, poly(ethylene oxide) is used, the number average molecular weight Mn is preferably approximately two million through eight million.

Examples of the electrolyte used for impregnating the polymer of poly(alkylene oxide) series are $LiClO_4$, $LiCF_3SO_3$, $LiPF_6$, $LiBF_4$, $LiSbF_6$, $LiAsF_6$, $LiN(C_mF_{2m+1}SO_2)(C_nF_{2n+1}SO_2)$ (wherein m and n independently indicate an integer ranging between 1 and 5), and $LiC(C_pF_{2p+1}SO_2)(C_qF_{2q+1}SO_2)(C_rF_{2r+1}SO_2)$ (wherein p, q and r independently indicate an integer ranging between 1 and 5). Examples of the solvent are ethylene carbonate, propylene carbonate, butylene carbonate, vinylene carbonate, dimethyl carbonate, diethyl carbonate, methylethyl carbonate, γ-butyrolactone, sulfolane, 1,2-dimethoxyethane, 1,2-diethoxyethane, 1,2-ethoxymethoxyethane, tetrahydrofuran, 2-methyl-1,3-dioxolane, 4-methyl-1,3-dioxolane, dimethyl ether, diethyl ether, ethyl acetate and methyl propionate. The liquid electrolyte preferably includes $LiN(C_mF_{2m+1}SO_2)(C_nF_{2n+1}SO_2)$ (wherein m and n independently indicate an integer ranging between 1 and 5) and/or $LiC(C_pF_{2p+1}SO_2)(C_qF_{2q+1}SO_2)(C_rF_{2r+1}SO_2)$ (wherein p, q and r independently indicate an integer ranging between 1 and 5) in a concentration of 0.1 through 2.0 mol/liter because the elution of manganese can be thus effectively suppressed during charge-discharge cycles. When another solute is used together with $LiN(C_mF_{2m+1}SO_2)(C_nF_{2n+1}SO_2)$ (wherein m and n independently indicate an integer ranging between 1 and 5) and/or $LiC(C_pF_{2p+1}SO_2)(C_qF_{2q+1}SO_2)(C_rF_{2r+1}SO_2)$ (wherein p, q and r independently indicate an integer ranging between 1 and 5), the concentration of the solutes in the liquid electrolyte is preferably lower than 2.0 mol/liter.

In the case where the gelled polymeric electrolyte (A) and the gelled polymeric electrolyte (B) are made from the same material, a film of a polymer of poly(alkylene oxide) series is formed on a positive electrode by a casting method or the like, and part of the cast polymer of poly(alkylene oxide) series is allowed to be included in the positive electrode at the same time. Subsequently, the polymer of poly(alkylene oxide) series is impregnated with the same liquid electrolyte. In this manner, the film-like gelled polymeric electrolyte (B) also serving as the separator and the positive electrode including the gelled polymeric electrolyte (A) are preferably integrally fabricated because the fabrication can be thus eased and the contact resistance between the gelled polymeric electrolyte also serving as the separator and the positive electrode can be lowered.

The spinel type lithium manganese oxide used as the active material of the positive electrode is lithium manganese oxide having a spinel structure belonging to the cubic system. A specific example of the spinel type lithium manganese oxide is $LiM_xMn_{2-x}O_4$ (wherein M is at least one element selected from the group consisting of Ni, Al, Mg, Fe and Co; and $0 \leq x \leq 0.5$).

Examples of the material for the negative electrode are a substance capable of electrochemically occluding and discharging lithium ions and metallic lithium. Examples of the substance capable of electrochemically occluding and discharging lithium ions are a carbon material such as graphite (natural graphite and artificial graphite), coke and an organic baked substance; lithium alloy such as lithium—aluminum alloy, lithium- magnesium alloy, lithium—indium alloy, lithium—tin alloy, lithium—thallium alloy, lithium—lead alloy and lithium—bismuth alloy; and a metal oxide or metal sulfide including one of or two or more of tin, titanium, iron, molybdenum, niobium, vanadium and zinc.

Since the present battery uses a positive electrode including a specific gelled polymeric electrolyte (A), the contact area between the positive electrode active material and the gelled polymeric electrolyte is large. Accordingly, the present battery can attain large initial discharge capacity (at high rate discharge in particular). Also, since the present battery uses a specific gelled polymeric electrolyte (B) as the electrolyte, manganese included in spinel type lithium manganese oxide is minimally eluted, which can reduce the degradation of the discharge capacity derived from elution of manganese during charge-discharge cycles. Accordingly, the present battery can exhibit good charge-discharge cycle performance.

PREFERRED EMBODIMENTS

The present invention will now be described in detail on the basis of preferred embodiments thereof, and it is noted that the invention is not limited to the following embodiments but can be practiced with appropriate modification without departing from the scope of the invention.

Embodiment 1

Preparation of Positive Electrode

Lithium nitrate ($LiN_3$), nickel nitrate ($Ni(NO_3)_2$) and manganese acetate ($Mn(CH_3COO)_2$) were mixed in a molar ratio of 1:0.4:1.6, and the mixture was baked at 600° C. for 24 hours in the air, thereby obtaining $LiNi_{0.4}Mn_{1.6}O_4$. Then, the $LiNi_{0.4}Mn_{1.6}O_4$ was crushed with a jet mill, so as to prepare a spinel type lithium manganese oxide powder with a median diameter of 10 μm. The spinel type lithium manganese oxide powder, a carbon powder serving as a conductive agent and a poly(vinylidene fluoride) powder serving as a binder were mixed in a weight ratio of 85:10:5, and the mixture was kneaded with NMP (N-methyl-2-pyrrolidone) to give a paste. The paste was applied on a positive electrode collector (stainless steel plate) by a doctor blade method (to attain a thickness of 80 μm after drying), and the resultant was heated at 130° C., thereby preparing a positive electrode (porous electrode) in the shape of a disk with a diameter of 10 mm.

Preparation of Gelled Polymeric Electrolyte also Serving as Separator

Poly(ethylene glycol) ethyl ether acrylate (with a number average molecular weight Mn of 360; $CH_2=CH—COO—(CH_2—CH_2—O)n—CH_2—CH_3$) and a liquid electrolyte obtained by dissolving 1 M (mol/liter) of $LiClO_4$ in a mixed solvent including ethylene carbonate and dimethyl carbonate in a volume ratio of 2:3 were mixed in a weight ratio of 1:1. The mixture was applied on the positive electrode into a thickness of 25 μm, and irradiated with electron beams with a beam irradiation apparatus with electron curtain system (having output power of 200 kV, exposure of 2 Mrad and a travel speed of an irradiated target of 1 m/min.), thereby polymerizing the poly(ethylene glycol) ethyl ether acrylate. Thus, a gelled polymeric electrolyte film also serving as a separator was formed on one face of the positive electrode. It was confirmed through observation with a scanning electron microscope (SEM) that the gelled polymeric electrolyte had entered the inside of the positive electrode.

Preparation of Negative Electrode

A graphite powder with an average particle size of 10 μm serving as a lithium ion occluding agent and poly(vinylidene fluoride) serving as a binder were mixed in a weight ratio of 95:5, and the mixture was kneaded with NMP to give a paste. The paste was applied on a negative electrode collector (stainless steel plate) by the doctor blade method (to attain a thickness of 70 μm after drying), and the resultant was heated at 130° C., thereby preparing a negative electrode in the shape of a disk with a diameter of 10 mm.

Fabrication of Lithium Secondary Battery using Gelled Polymeric Electrolyte

Figure 1:
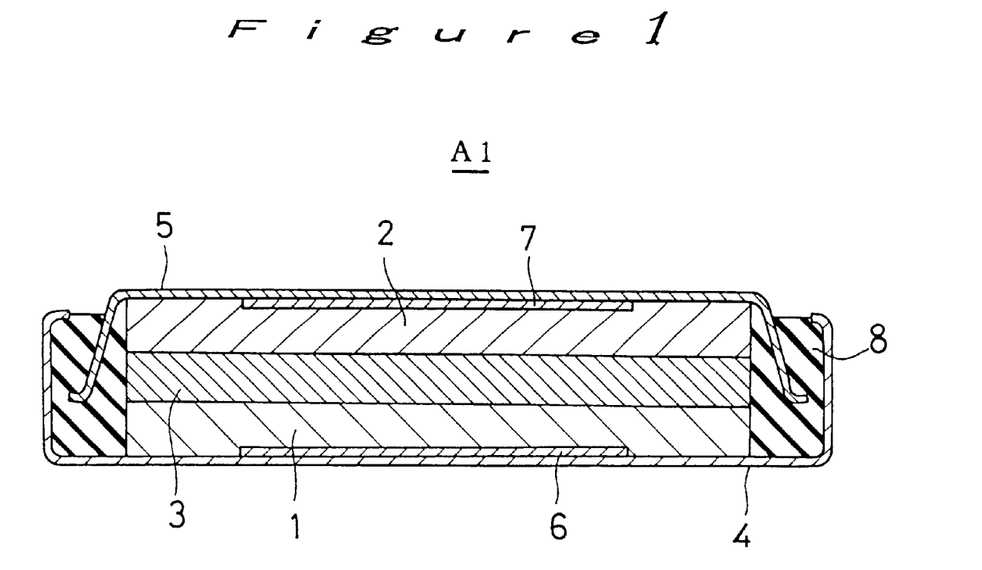
FIG. 1 is a sectional view of a lithium secondary battery using a gelled polymeric electrolyte fabricated in an embodiment.

The negative electrode was placed on the gelled polymeric electrolyte film formed on one face of the positive electrode and the resultant was housed in a battery can, thereby fabricating a flat lithium secondary battery (present battery) A1 using the gelled polymeric electrolyte. The capacity ratio between the positive electrode and the negative electrode was set to 1:1.1, so as to control the battery capacity by the positive electrode capacity. In every battery described below, the capacity ratio between the positive electrode and the negative electrode was also set to 1:1.1. FIG. 1 is a sectional view of the lithium secondary battery A1 using the gelled polymeric electrolyte, and the battery A1 of FIG. 1 comprises a positive electrode 1, a negative electrode 2, a gelled polymeric electrolyte film 3 for separating these electrodes, a positive electrode can 4, a negative electrode can 5, a positive electrode collector 6, a negative electrode collector 7, an insulating packing 8 and the like. The positive electrode 1 and the negative electrode 2 opposing each other with the gelled polymeric electrolyte film 3 impregnated with a liquid electrolyte sandwiched therebetween are housed in the battery can formed by the positive electrode can 4 and the negative electrode can 5. The positive electrode 1 is connected to the positive electrode can 4 through the positive electrode collector 6, and, the negative electrode 2 is connected to the negative electrode can 5 through the negative electrode collector 7, so that chemical energy generated within the battery can be taken out as electric energy.

Embodiment 2

Lithium nitrate, aluminum hydroxide ($Al(OH)_3$) and manganese acetate were mixed in a molar ratio of 1:0.4:1.6, and the mixture was baked at 800° C. for 24 hours in the air, thereby obtaining $LiAl_{0.4}Mn_{1.6}O_4$. The $LiAl_{0.4}Mn_{0.6}O_4$ was crushed with a jet mill to give a spinel type lithium manganese oxide powder with a median diameter of 10 $\mu$m. The spinel type lithium manganese oxide powder, a carbon powder serving as a conductive agent and a poly(vinylidene fluoride) powder serving as a binder were mixed in a weight ratio of 85:10:5. The mixture was kneaded with NMP to give a paste. The paste was applied on a positive electrode collector (stainless steel plate) by the doctor blade method (to attain a thickness of 80 $\mu$m after drying), and the resultant was heated at 130° C. Thus, a positive electrode (porous electrode) in the shape of a disk with a diameter of 10 mm was prepared.

Next, poly(ethylene glycol) ethyl ether acrylate (with a number average molecular weight Mn of 360; $CH_2=CH-COO-(CH_2-CH_2-O)n-CH_2-CH_3$) and a liquid electrolyte obtained by dissolving 1 M (mol/liter) of $LiClO_4$ in a mixed solvent including ethylene carbonate and dimethyl carbonate in a volume ratio of 2:3 were mixed in a weight ratio of 1:1. The resultant was applied on the positive electrode into a thickness of 25 $\mu$m, and irradiated with electron beams with a beam irradiation apparatus with electron curtain system (having output power of 200 kV, exposure of 2 Mrad and a travel speed of an irradiated target of 1 m/min.), thereby polymerizing the poly(ethylene glycol) ethyl ether acrylate. Thus, a gelled polymeric electrolyte film also serving as a separator was formed on one face of the positive electrode. It was confirmed through observation with a scanning electron microscope (SEM) that the gelled polymeric electrolyte had entered the inside of the positive electrode.

Then, a negative electrode (the same as that prepared in Embodiment 1) was placed on the gelled polymeric electrolyte film formed on one face of the positive electrode and the resultant was housed in a battery can. Thus, a flat lithium secondary battery (present battery) A2 using the gelled polymeric electrolyte was fabricated.

Embodiment 3

Lithium nitrate, magnesium acetate ($Mg(CH_3COO)_2$) and manganese acetate were mixed in a molar ratio of 1:0.4:1.6, and the mixture was baked at 700° C. for 24 hours in the air, thereby obtaining $LiMg_{0.4}Mn_{1.6}O_4$. The $LiMg_{0.4}Mn_{0.6}O_4$ was crushed with a jet mill to give a spinel type lithium manganese oxide powder with a median diameter of 10 $\mu$m. The spinel type lithium manganese oxide powder, a carbon powder serving as a conductive agent and a poly(vinylidene fluoride) powder serving as a binder were mixed in a weight ratio of 85:10:5. The mixture was kneaded with NMP to give a paste. The paste was applied on a positive electrode collector (stainless steel plate) by the doctor blade method (to attain a thickness of 80 $\mu$m after drying), and the resultant was heated at 130° C. Thus, a positive electrode (porous electrode) in the shape of a disk with a diameter of 10 mm was prepared.

Next, poly(ethylene glycol) ethyl ether acrylate (with a number average molecular weight Mn of 360; $CH_2=CH-COO-(CH_2-CH_2-O)n-CH_2-CH_3$) and a liquid electrolyte obtained by dissolving 1 M (mol/liter) of $LiClO_4$ in a mixed solvent including ethylene carbonate and dimethyl carbonate in a volume ratio of 2:3 were mixed in a weight ratio of 1:1. The resultant was applied on the positive electrode into a thickness of 25 $\mu$m, and irradiated with electron beams with a beam irradiation apparatus with electron curtain system (having output power of 200 kV, exposure of 2 Mrad and a travel speed of an irradiated target of 1 m/min.), thereby polymerizing the poly(ethylene glycol) ethyl ether acrylate. Thus, a gelled polymeric electrolyte film also serving as a separator was formed on one face of the positive electrode. It was confirmed through observation with a scanning electron microscope (SEM) that the gelled polymeric electrolyte had entered the inside of the positive electrode.

Then, a negative electrode (the same as that prepared in Embodiment 1) was placed on the gelled polymeric electrolyte film formed on one face of the positive electrode and the resultant was housed in a battery can. Thus, a flat lithium secondary battery (present battery) A3 using the gelled polymeric electrolyte was fabricated.

Embodiment 4

Lithium nitrate, ferric nitrate ($Fe(NO_3)_3$) and manganese acetate were mixed in a molar ratio of 1:0.4:1.6, and the mixture was baked at 700° C. for 24 hours in the air, thereby obtaining $LiFe_{0.4}Mn_{1.6}O_4$. The $LiFe_{0.4}Mn_{0.6}O_4$ was crushed with a jet mill to give a spinel type lithium manganese oxide powder with a median diameter of 10 $\mu$m. The spinel type lithium manganese oxide powder, a carbon powder serving as a conductive agent and a poly(vinylidene fluoride) powder serving as a binder were mixed in a weight ratio of 85:10:5. The mixture was kneaded with NMP to give a paste. The paste was applied on a positive electrode collector (stainless steel plate) by the doctor blade method (to attain a thickness of 80 $\mu$m after drying), and the resultant was heated at 130° C. Thus, a positive electrode (porous electrode) in the shape of a disk with a diameter of 10 mm was prepared. Next, poly(ethylene glycol) ethyl ether acrylate (with a number average molecular weight Mn of 360; $CH_2=CH-COO-(CH_2-CH_2-O)n-CH_2-CH_3$) and a liquid electrolyte obtained by dissolving 1 M (mol/liter) of $LiClO_4$ in a mixed solvent including ethylene carbonate and dimethyl carbonate in a volume ratio of 2:3 were mixed in a weight ratio of 1:1. The resultant was applied on the positive electrode into a thickness of 25 $\mu$m, and irradiated with electron beams with a beam irradiation apparatus with electron curtain system (having output power of 200 kV, exposure of 2 Mrad and a travel speed of an irradiated target of 1 m/min.), thereby polymerizing the poly(ethylene glycol) ethyl ether acrylate. Thus, a gelled polymeric electrolyte film also serving as a separator was formed on one face of the positive electrode. It was confirmed through observation with a scanning electron microscope (SEM) that the gelled polymeric electrolyte had entered the inside of the positive electrode.

Then, a negative electrode (the same as that prepared in Embodiment 1) was placed on the gelled polymeric electrolyte film formed on one face of the positive electrode and the resultant was housed in a battery can. Thus, a flat lithium secondary battery (present battery) A4 using the gelled polymeric electrolyte was fabricated.

Embodiment 5

Lithium nitrate, cobalt acetate ($Co(CH_3COO)_2$) and manganese acetate were mixed in a molar ratio of 1:0.4:1.6, and the mixture was baked at 700° C. for 24 hours in the air, thereby obtaining $LiCo_{0.4}Mn_{1.6}O_4$. The $LiCo_{0.4}Mn_{0.6}O_4$ was crushed with a jet mill to give a spinel type lithium manganese oxide powder with a median diameter of 10 $\mu$m. The spinel type lithium manganese oxide powder, a carbon powder serving as a conductive agent and a poly(vinylidene fluoride) powder serving as a binder were mixed in a weight ratio of 85:10:5. The mixture was kneaded with NMP to give a paste. The paste was applied on a positive electrode collector (stainless steel plate) by the doctor blade method (to attain a thickness of 80 μm after drying), and the resultant was heated at 130° C. Thus, a positive electrode (porous electrode) in the shape of a disk with a diameter of 10 mm was prepared. Next, poly(ethylene glycol) ethyl ether acrylate (with a number average molecular weight Mn of 360; $CH_2=CH-COO-(CH_2-CH_2-O)n-CH_2-CH_3$) and a liquid electrolyte obtained by dissolving 1 M (mol/liter) of $LiClO_4$ in a mixed solvent including ethylene carbonate and dimethyl carbonate in a volume ratio of 2:3 were mixed in a weight ratio of 1:1. The resultant was applied on the positive electrode into a thickness of 25 μm, and irradiated with electron beams with a beam irradiation apparatus with electron curtain system (having output power of 200 kV, exposure of 2 Mrad and a travel speed of an irradiated target of 1 m/min.), thereby polymerizing the poly(ethylene glycol) ethyl ether acrylate. Thus, a gelled polymeric electrolyte film also serving as a separator was formed on one face of the positive electrode. It was confirmed through observation with a scanning electron microscope (SEM) that the gelled polymeric electrolyte had entered the inside of the positive electrode.

Then, a negative electrode (the same as that prepared in Embodiment 1) was placed on the gelled polymeric electrolyte film formed on one face of the positive electrode and the resultant was housed in a battery can. Thus, a flat lithium secondary battery (present battery) A5 using the gelled polymeric electrolyte was fabricated.

Embodiment 6

A block copolymer of poly(ethylene oxide) and polystyrene (with a copolymerization ratio of 1:1 and a number average molecular weight Mn of approximately 300,000) was dissolved in NMP to give a solution (with a solid content of 20 wt %). The solution was applied on one face of a positive electrode the same as that prepared in Embodiment 1 into a thickness of 25 μm, thereby forming a block copolymer film of poly(ethylene oxide) and polystyrene. This positive electrode was immersed in a liquid electrolyte obtained by dissolving 1 M of $LiClO_4$ in a mixed solvent including ethylene carbonate and dimethyl carbonate in a volume ratio of 2:3, so as to impregnate the block copolymer of poly(ethylene oxide) and polystyrene. with the liquid electrolyte. Thus, a gelled polymeric electrolyte film also serving as a separator was formed on one face of the positive electrode. It was confirmed through observation with a scanning electron microscope that the gelled polymeric electrolyte had entered the inside of the positive electrode. Next, a negative electrode (the same as that prepared in Embodiment 1) was placed on the gelled polymeric electrolyte film formed on one face of the positive electrode and the resultant was housed in a battery can. Thus, a flat lithium secondary battery (present battery) A6 using the gelled polymeric electrolyte was fabricated.

COMPARATIVE EXAMPLE 1

A flat lithium secondary battery (comparative battery) B1 using a gelled polymeric electrolyte was fabricated in the same manner as in Embodiment 1 except for the following: Instead of the gelled polymeric electrolyte film also serving as a separator, a liquid electrolyte obtained by dissolving 1 M of $LiClO_4$ in a mixed solvent including ethylene carbonate and dimethyl carbonate in a volume ratio of 2:3 and a polyethylene microporous film (separator) with a thickness of 25 μm were used, and the gelled polymeric electrolyte was not included in the positive electrode.

COMPARATIVE EXAMPLE 2

Poly(vinylidene fluoride) (with a number average molecular weight Mn of approximately 110,000) was dissolved in acetone to give a solution (with a solid content of 10 wt %). The solution was applied on one face of a positive electrode the same as that prepared in Embodiment 1 into a thickness of 25 μm, thereby forming a poly(vinylidene fluoride) film. The positive electrode was immersed in a liquid electrolyte obtained by dissolving 1 M of $LiClO_4$ in a mixed solvent including ethylene carbonate and dimethyl carbonate in a volume ratio of 2:3, so as to impregnate the poly(vinylidene fluoride) with the liquid electrolyte. Thus, a gelled polymeric electrolyte film also serving as a separator was formed on one face of the positive electrode. It was confirmed through observation with a scanning electron microscope that the gelled polymeric electrolyte had entered the inside of the positive electrode. Next, a negative electrode (the same as that prepared in Embodiment 1) was placed on the gelled polymeric electrolyte film formed on one face of the positive electrode and the resultant was housed in a battery can. Thus, a flat lithium secondary battery (comparative battery) B2 using the gelled polymeric electrolyte was prepared.

COMPARATIVE EXAMPLE 3

A block copolymer of poly(ethylene oxide) and polystyrene (with a copolymerization ratio of 1:1 and a number average molecular weight Mn of approximately 300,000) was dissolved in NMP to give a solution (with a solid content of 20 wt %). The solution was formed by the casting method into a block copolymer film of poly(ethylene oxide) and polystyrene with a thickness of 25 μm. Then, the film was immersed in a liquid electrolyte obtained by dissolving 1 M of $LiClO_4$ in a mixed solvent including ethylene carbonate and dimethyl carbonate in a volume ratio of 2:3, so as to impregnate the block copolymer of poly(ethylene oxide) and polystyrene with the liquid electrolyte by 100 wt %. Thus, a gelled polymeric electrolyte film also serving as a separator was formed. Next, the gelled polymeric electrolyte film was sandwiched between a positive electrode and a negative electrode the same as those prepared in Embodiment 1 (whereas the positive electrode was not impregnated with the gelled polymeric electrolyte), and the resultant was housed in a battery can. Thus, a flat lithium secondary battery (comparative battery) B3 using the gelled polymeric electrolyte was fabricated.

Discharge Capacity of each Battery at 1st and 100th Cycles

With respect to each of the present batteries A1 through A6 and the comparative batteries B1 through B3, 100 charge-discharge cycles were run, in each cycle of which the battery was charged to 4.2 V at a current density of 100 $\mu A/cm^2$ and discharged to 2.75 V at a current density of 100 $\mu A/cm^2$ at 25° C., thereby obtaining the discharge capacity (mAh) of the battery at the 1st and 100th cycles. The results are shown in Table 1.

TABLE 1

|  | Discharge capacity (mAh) | |
| --- | --- | --- |
|  | 1st cycle | 100th cycle |
| Present battery A1 | 2.2 | 1.8 |
| Present battery A2 | 2.2 | 2.0 |
| Present battery A3 | 2.1 | 1.9 |
| Present battery A4 | 2.1 | 1.9 |
| Present battery A5 | 2.2 | 2.0 |
| Present battery A6 | 2.2 | 2.0 |

TABLE 1-continued

| | Discharge capacity (mAh) | |
|---|---|---|
| | 1st cycle | 100th cycle |
| Comparative battery B1 | 2.2 | 1.2 |
| Comparative battery B2 | 2.2 | 1.2 |
| Comparative battery B3 | 1.9 | 1.7 |

As is shown in Table 1, the discharge capacity at the 100th cycle is larger in the present batteries A1 through A6 than in the comparative batteries B1 and B2. Also, the discharge capacity at the 1st cycle is larger in the present batteries A1 through A6 than in the comparative battery B3. It is understood from the results that the invention provides a lithium secondary battery using a gelled polymeric electrolyte with large initial discharge capacity and good charge-discharge cycle performance. The discharge capacity at the 100th cycle of the comparative battery B1 was small probably because manganese was eluted into the liquid electrolyte, and the discharge capacity at the 100th cycle of the comparative battery B2 was small probably because manganese was eluted into the liquid electrolyte impregnated into the gelled polymeric electrolyte film also serving as the separator. Furthermore, the discharge capacity at the 1st cycle of the comparative battery B3 is small probably because a contact area between the positive electrode and the electrolyte was so small that the contact resistance on the interface was large.

Embodiment 7

Preparation of Positive Electrode

Lithium nitrate and manganese dioxide were mixed in a molar ratio of 1:2, and the mixture was baked at 600° C. for 24 hours in the air, thereby obtaining $LiMn_2O_4$. The $LiMn_2O_4$ was crushed with a jet mill to give a spinel type lithium manganese oxide powder with a median diameter of 10 μm. The spinel type lithium manganese oxide powder, a carbon powder serving as a conductive agent, a poly (vinylidene fluoride) powder serving as a binder and a block copolymer of poly(ethylene oxide) and polystyrene (with a copolymerization ratio of 1:1 and a number average molecular weight Mn of approximately 300,000) were mixed in a weight ratio of 85:10:3:2. The resultant mixture was kneaded with NMP to give a paste, the paste was applied on a positive electrode collector (aluminum plate) by the doctor blade method (to attain a thickness of 80 μm after drying), and the resultant was heated at 130° C. Thus, a positive electrode (porous electrode) in the shape of a disk with a diameter of 10 mm was prepared. The positive electrode was immersed in a liquid electrolyte obtained by dissolving 1 M of $LiN(C_2F_5SO_2)_2$ in a mixed solvent including ethylene carbonate and diethyl carbonate in a volume ratio of 1:1, so as to impregnate the block copolymer of poly(ethylene oxide) and polystyrene with the liquid electrolyte.

Preparation of Gelled Polymeric Electrolyte also Serving as Separator

A block copolymer of poly(ethylene oxide) and polystyrene (with a copolymerization ratio of 1:1 and a number average molecular weight Mn of approximately 300,000) was dissolved in NMP to give a 20 wt % solution. The solution was formed by the casting method into a block copolymer film of poly(ethylene oxide) and polystyrene with a thickness of 25 μm. Next, the film was immersed in a liquid electrolyte obtained by dissolving 1 M of LiN $(C_2F_5SO_2)_2$ in a mixed solvent including ethylene carbonate and diethyl carbonate in a volume ratio of 1:1, so as to impregnate the block copolymer of poly(ethylene oxide) and polystyrene with the liquid electrolyte. Thus, a gelled polymeric electrolyte film also serving as a separator was prepared.

Fabrication of Lithium Secondary Battery using Gelled Polymeric Electrolyte

The gelled polymeric electrolyte film also serving as a separator was sandwiched between the positive electrode and a negative electrode (the same as that prepared in Embodiment 1) and the resultant was housed in a battery can. Thus, a flat lithium secondary battery (present battery) A7 using the gelled polymeric electrolyte was fabricated.

Embodiment 8

A flat lithium secondary battery (present battery) A8 using a gelled polymeric electrolyte was fabricated in the same manner as in Embodiment 7 except that a liquid electrolyte obtained by dissolving 1 M of $LiN(CF_3SO_2)_2$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 9

A flat lithium secondary battery (present battery) A9 using a gelled polymeric electrolyte was fabricated in the same manner as in Embodiment 7 except that a liquid electrolyte obtained by dissolving 1 M of $LiN(CF_3SO_3)(C_4F_9SO_2)$ in a mixed solvent including ethylene carbonate and diethyl carbonate in a volume ratio of 1:1 was used as the liquid electrolyte for impregnating the block copolymer of poly (ethylene oxide) and polystyrene in the preparation of the positive electrode and the gelled polymeric electrolyte film also serving as the separator.

Embodiment 10

A flat lithium secondary battery (present battery) A10 using a gelled polymeric electrolyte was fabricated in the same manner as in Embodiment 7 except that a liquid electrolyte obtained by dissolving 1 M of $LiN(C_4F_9SO_2)_2$ in a mixed solvent including ethylene carbonate and diethyl carbonate in a volume ratio of 1:1 was used as the liquid electrolyte for impregnating the block copolymer of poly (ethylene oxide) and polystyrene in the preparation of the positive electrode and the gelled polymeric electrolyte film also serving as the separator.

Embodiment 11

A flat lithium secondary battery (present battery) A11 using a gelled polymeric electrolyte was fabricated in the same manner as in Embodiment 7 except that a liquid electrolyte obtained by dissolving 1 M of $LiC(CF_3SO_2)_3$ in a mixed solvent including ethylene carbonate and diethyl carbonate in a volume ratio of 1:1 was used as the liquid electrolyte for impregnating the block copolymer of poly (ethylene oxide) and polystyrene in the preparation of the positive electrode and the gelled polymeric electrolyte film also serving as the separator.

Embodiment 12

A flat lithium secondary battery (present battery) A12 using a gelled polymeric electrolyte was fabricated in the same manner as in Embodiment 7 except that a liquid electrolyte obtained by dissolving 1 M of $LiC(CF_3SO_2)_2$ $(C_4F_9SO_2)$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 13

A flat lithium secondary battery (present battery) A13 using a gelled polymeric electrolyte was fabricated in the same manner as in Embodiment 7 except that a liquid electrolyte obtained by dissolving 1 M of $LiC(CF_3SO_2)$ $(C_4F_9SO_2)_2$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 4

A flat lithium secondary battery (present battery) A14 using a gelled polymeric electrolyte was fabricated in the same manner as in Embodiment 7 except that a liquid electrolyte obtained by dissolving 1 M of $LiC(C_4F_9SO_2)_3$ in a mixed solvent including ethylene carbonate and diethyl carbonate in a volume ratio of 1:1 was used as the liquid electrolyte for impregnating the block copolymer of poly (ethylene oxide) and polystyrene in the preparation of the positive electrode and the gelled polymeric electrolyte film also serving as the separator.

Embodiment 15

A flat lithium secondary battery (present battery) A15 using a gelled polymeric electrolyte was fabricated in the same manner as in Embodiment 7 except that a liquid electrolyte obtained by dissolving 1 M of $LiN(CF_3SO_2)$ $(C_5F_{11}SO_2)$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 16

A flat lithium secondary battery (present battery) A16 using a gelled polymeric electrolyte was fabricated in the same manner as in Embodiment 7 except that a liquid electrolyte obtained by dissolving 0.1 M of $LiPF_6$ and 0.9 M of $LiN(C_2F_5SO_2)_2$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 17

A flat lithium secondary battery (present battery) A17 using a gelled polymeric electrolyte was fabricated in the same manner as in Embodiment 7 except that a liquid electrolyte obtained by dissolving 0.5 M of $LIPF_6$ and 0.5 M of $LiN(C_2F_5SO_2)_2$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 18

A flat lithium secondary battery (present battery) A18 using a gelled polymeric electrolyte was fabricated in the same manner as in Embodiment 7 except that a liquid electrolyte obtained by dissolving 0.9 M of $LiPF_6$ and 0.1 M of $LiN(C_2F_5SO_2)_2$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 19

A flat lithium secondary battery (present battery) A19 using a gelled polymeric electrolyte was fabricated in the same manner as in Embodiment 7 except that a liquid electrolyte obtained by dissolving 1 M of $LiClO_4$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 20

A flat lithium secondary battery (present battery) A20 using a gelled polymeric electrolyte was fabricated in the same manner as in Embodiment 7 except that a liquid electrolyte obtained by dissolving 1 M of $LiBF_4$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

Embodiment 21

A flat lithium secondary battery (present battery) A21 using a gelled polymeric electrolyte was fabricated in the same manner as in Embodiment 7 except that a liquid electrolyte obtained by dissolving 1 M of $LiPF_6$ in a mixed solvent including ethylene carbonate and diethyl carbonate in a volume ratio of 1:1 was used as the liquid electrolyte for impregnating the block copolymer of poly(ethylene oxide) and polystyrene in the preparation of the positive electrode and the gelled polymeric electrolyte film also serving as the separator.

COMPARATIVE EXAMPLE 4

A flat lithium secondary battery (comparative battery) B4 using a gelled polymeric electrolyte was fabricated in the same manner as in Embodiment 3 except that a liquid electrolyte obtained by dissolving 1 M of $LiClO_4$ in a mixed solvent including ethylene carbonate and diethyl carbonate in a volume ratio of 1:1 and a polyethylene microporous film (separator) with a thickness of 25 $\mu$m were used instead of the gelled polymeric electrolyte film also serving as the separator and that the gelled polymeric electrolyte was not included in the positive electrode.

COMPARATIVE EXAMPLE 5

A flat lithium secondary battery (comparative battery) B5 using a gelled polymeric electrolyte was fabricated in the same manner as in Embodiment 3 except that a liquid electrolyte obtained by dissolving 1 M of $LiBF_4$ in a mixed solvent including ethylene carbonate and diethyl carbonate in a volume ratio of 1:1 and a polyethylene microporous film (separator) with a thickness of 25 µm were used instead of the gelled polymeric electrolyte film also serving as the separator and that the gelled polymeric electrolyte was not included in the positive electrode.

COMPARATIVE EXAMPLE 6

A flat lithium secondary battery (comparative battery) B6 using a gelled polymeric electrolyte was fabricated in the same manner as in Embodiment 3 except that a liquid electrolyte obtained by dissolving 1 M of $LiPF_6$ in a mixed solvent including ethylene carbonate and diethyl carbonate in a volume ratio of 1:1 and a polyethylene microporous film (separator) with a thickness of 25 µm were used instead of the gelled polymeric electrolyte film also serving as the separator and that the gelled polymeric electrolyte was not included in the positive electrode.

COMPARATIVE EXAMPLE 7

A flat lithium secondary battery (comparative battery) B7 using a gelled polymeric electrolyte was fabricated in the same manner as in Embodiment 3 except that a liquid electrolyte obtained by dissolving 1 M of $LiN(C_2F_5SO_2)_2$ in a mixed solvent including ethylene carbonate and diethyl carbonate in a volume ratio of 1:1 and a polyethylene microporous film (separator) with a thickness of 25 µm were used instead of the gelled polymeric electrolyte film also serving as the separator and that the gelled polymeric electrolyte was not included in the positive electrode.

Discharge Capacity of Battery at 1st and 100th Cycles

With respect to each of the present batteries A7 through A21 and the comparative batteries B4 through B7, 100 charge-discharge cycles were run under the aforementioned conditions, thereby obtaining the discharge capacity (mAh) at the 1st and 100th cycles. The results are shown in Table 2.

TABLE 2

|  | Discharge capacity (mAh) | |
| --- | --- | --- |
|  | 1st cycle | 100th cycle |
| Present battery A7 | 2.4 | 2.2 |
| Present battery A8 | 2.4 | 2.2 |
| Present battery A9 | 2.4 | 2.1 |
| Present battery A10 | 2.4 | 2.2 |
| Present battery A11 | 2.4 | 2.2 |
| Present battery A12 | 2.4 | 2.1 |
| Present battery A13 | 2.4 | 2.2 |
| Present battery A14 | 2.4 | 2.2 |
| Present battery A15 | 2.4 | 2.0 |
| Present battery A16 | 2.4 | 2.2 |
| Present battery A17 | 2.4 | 2.0 |
| Present battery A18 | 2.4 | 1.9 |
| Present battery A19 | 2.4 | 1.7 |
| Present battery A20 | 2.4 | 1.5 |
| Present battery A21 | 2.4 | 1.6 |
| Comparative battery B4 | 2.4 | 1.2 |
| Comparative battery B5 | 2.4 | 1.1 |
| Comparative battery B6 | 2.4 | 1.2 |
| Comparative battery B7 | 2.4 | 1.2 |

As is shown in Table 2, the discharge capacity at the 100th cycle is larger in the present batteries A7 through A21 sing the gelled polymeric electrolyte film also serving as the separator because of a smaller amount of manganese eluted during the charge-discharge cycles than in the comparative batteries B4 through B7 using the liquid electrolyte. Among the present batteries A7 through A21, the discharge capacity at the 100th cycle is particularly large in the present batteries A7 through A18. Accordingly, it is understood that the solute of the liquid electrolyte used for the impregnation is preferably $LiN(C_mF_{2m+1}SO_2)(C_nF_{2n+1}SO_2)$ (wherein m and n independently indicate an integer ranging between 1 and 5) or $LiC(C_pF_{2p+1}SO_2)(C_qF_{2q+1}SO_2)(C_rF_{2r+1}SO_2)$ (wherein p, q and r independently indicate an integer ranging between 1 and 5).

Relationship Between Concentration of Liquid Electrolyte and Charge-discharge Cycle Performance Seven kinds of lithium secondary batteries (present batteries) A22 through A28 each using a gelled polymeric electrolyte were fabricated in the same manner as in Embodiment 7 except that a liquid electrolyte obtained by dissolving 0.05 M, 0.1 M, 0.5 M, 1.5 M, 2.0 M, 2.5 M or 3.0 M of $LiN(C_2F_5SO_2)_2$ in a mixed solvent including ethylene carbonate and diethyl carbonate in a volume ratio of 1:1 was used as the liquid electrolyte for impregnating the block copolymer of poly(ethylene oxide) and polystyrene in the fabrication of the positive electrode and the gelled polymeric electrolyte film also serving as the separator. Subsequently, with respect to each of the batteries, 100 charge-discharge cycles were run under the aforementioned conditions, thereby obtaining the discharge capacity (mAh) at the 1st and 100th cycles. The results are shown in Table 3. Table 3 also shows the discharge capacity at the 1st and 100th cycles of the present battery A7 listed in Table 2.

TABLE 3

|  | Concentration of $LiN(C_2F_5SO_2)_2$ in liquid electrolyte | Discharge capacity (mAh) | |
| --- | --- | --- | --- |
|  | (M) | 1st cycle | 100th cycle |
| Present battery A22 | 0.05 | 2.4 | 1.3 |
| Present battery A23 | 0.1 | 2.4 | 1.6 |
| Present battery A24 | 0.5 | 2.4 | 1.9 |
| Present battery A7 | 1.0 | 2.4 | 2.2 |
| Present battery A25 | 1.5 | 2.4 | 2.0 |
| Present battery A26 | 2.0 | 2.4 | 1.6 |
| Present battery A27 | 2.5 | 2.4 | 1.3 |
| Present battery A28 | 3.0 | 2.4 | 1.3 |

It is understood from Table 3 that the liquid electrolyte preferably includes 0.1 through 2.0 M of $LiN(C_2F_5SO_2)_2$. It was also confirmed that a concentration of 0.1 through 2.0 M is preferred in using any of other liquid electrolytes according to this invention represented by $LiN(C_mF_{2m+1}SO_2)(C_nF_{2n+1}SO_2)$ or $LiC(C_pF_{2p+1}SO_2)(C_qF_{2q+1}SO_2)(C_rF_{2r+1}SO_2)$.

INDUSTRIAL APPLICABILITY

The invention provides a lithium secondary battery using a gelled polymeric electrolyte with large initial discharge capacity and good charge-discharge cycle performance.

What is claimed is:

1. A lithium secondary battery comprising a positive electrode comprising a lithium manganese oxide spinel as the active material and a gelled polymeric electrolyte (A); a negative electrode; and a gelled polymeric electrolyte (B) in the shape of a film or sheet serving as a separator, the gelled polymeric electrolyte (A) and the gelled polymeric electrolyte (B) each being made from the same material which is a block copolymer of poly(ethylene oxide) and polystyrene impregnated with a liquid electrolyte.

2. The lithium secondary battery using a gelled polymeric electrolyte according to claim 1, wherein the lithium manganese oxide spinel is $LiM_xMn_{2-x}O_4$, wherein M is at least one element selected from the group consisting of Ni, Al, Mg, Fe and Co, and $0 \leq x \leq 0.5$.

3. The lithium secondary battery using a gelled polymeric electrolyte according to claim 1, wherein the liquid electrolyte includes $LiN(C_mF_{2m+1}SO_2)(C_nF_{2n+1}SO_2)$ (wherein m and n independently indicate an integer ranging between 1 and 5) and/or $LiC(C_pF_{2p+1}SO_2)(C_qF_{2q+1}SO_2)(C_rF_{2r+1}SO_2)$ (wherein p, q and r independently indicate an integer ranging between 1 and 5).

4. The lithium secondary battery using a gelled polymeric electrolyte according to claim 1, wherein the liquid electrolyte includes $LiN(C_mF_{2m+1}SO_2)(C_nF_{2n+1}SO_2)$ (wherein m and n independently indicate an integer ranging between 1 and 5) and/or $LiC(C_pF_{2p+1}SO_2)(C_qF_{2q+1}SO_2)(C_rF_{2r+1}SO_2)$ (wherein p, q and r independently indicate an integer ranging between 1 and 5) in a concentration of 0.1–2.0 mol/liter.

* * * * *

UNITED STATES PATENT AND TRADEMARK OFFICE
CERTIFICATE OF CORRECTION

PATENT NO.   : 6,444,369 B1
DATED        : September 3, 2002
INVENTOR(S)  : Maruo Kamino et al.

It is certified that error appears in the above-identified patent and that said Letters Patent is hereby corrected as shown below:

<u>Title page,</u>
Item [30], Foreign Application Priority Data: "Jan. 8, 1998" should read
-- Jan. 8, 1999 --.

Signed and Sealed this

Seventh Day of January, 2003

JAMES E. ROGAN
*Director of the United States Patent and Trademark Office*